US012566291B2

(12) United States Patent
Kim et al.

(10) Patent No.: US 12,566,291 B2
(45) Date of Patent: Mar. 3, 2026

(54) SURFACE MOUNT TYPE OPTICAL MODULE AND ATTACHMENT/DETACHMENT APPARATUS AND METHOD THEREOF

(71) Applicant: Electronics and Telecommunications Research Institute, Daejeon (KR)

(72) Inventors: Dae Seon Kim, Daejeon (KR); Jong Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 218 days.

(21) Appl. No.: 18/465,791

(22) Filed: Sep. 12, 2023

(65) Prior Publication Data

US 2024/0094463 A1 Mar. 21, 2024

(30) Foreign Application Priority Data

Sep. 19, 2022 (KR) ........................ 10-2022-0117652

(51) Int. Cl.
G02B 6/12 (2006.01)
G02B 6/122 (2006.01)
(Continued)

(52) U.S. Cl.
CPC ......... G02B 6/12019 (2013.01); G02B 6/122 (2013.01); G02B 7/004 (2013.01); H01S 3/0315 (2013.01)

(58) Field of Classification Search
CPC .. G02B 6/3898; G02B 7/004; G02B 6/12019; G02B 6/422–4227; G02B 7/005
See application file for complete search history.

(56) References Cited

U.S. PATENT DOCUMENTS 7,010,232 B1 * 3/2006 Ott ........................ H04B 10/801
388/154
7,409,125 B2 * 8/2008 Azimi .................. G02B 6/4226
385/33
(Continued)

FOREIGN PATENT DOCUMENTS

JP 2001156436 A 6/2001
JP 2008034638 A 2/2008
(Continued)

*Primary Examiner* — Rhonda S Peace

(74) *Attorney, Agent, or Firm* — WILLIAM PARK AND ASSOCIATES LTD.

(57) ABSTRACT

The present disclosure is to provide a shape of a surface mount type optical module to be mounted on a surface of a system board or package submount, and is to provide a compact and lightweight optical module attachment/detachment apparatus that performs the mounting (attachment) and separation of the optical module in a confined space by automatically performing optical module loading/unloading, optical module alignment, and laser soldering to facilitate attachment and detachment of the optical module. The attachment/detachment apparatus includes a body frame; a fixing part for fixing the body frame to the board; a gripper for gripping the optical module; an aligning part for aligning the position of the optical module with respect to the board; and a laser part which irradiates a laser for non-contact bonding between the optical module and the board.

15 Claims, 5 Drawing Sheets

(51) Int. Cl.
  *G02B 7/00*   (2021.01)
  *H01S 3/03*   (2006.01)

(56)     References Cited

U.S. PATENT DOCUMENTS

| | | | |
|---|---|---|---|
| 9,265,140 | B2 | 2/2016 | Han et al. |
| 11,381,315 | B2 | 7/2022 | Han et al. |
| 2008/0095536 | A1* | 4/2008 | Shen ................... G02B 6/12019 |
| | | | 398/79 |
| 2012/0275820 | A1* | 11/2012 | Eto .................... G03G 21/1842 |
| | | | 399/110 |
| 2014/0341578 | A1* | 11/2014 | Ho ....................... G02B 6/4292 |
| | | | 398/68 |
| 2023/0204878 | A1* | 6/2023 | Morgan ............... G02B 6/4212 |
| | | | 385/33 |
| 2024/0094463 | A1* | 3/2024 | Kim ................... G02B 6/12019 |
| 2024/0126041 | A1* | 4/2024 | Kang ................. G02B 27/0012 |
| 2024/0418944 | A1* | 12/2024 | Wang ................... G02B 6/3672 |

FOREIGN PATENT DOCUMENTS

| | | |
|---|---|---|
| KR | 101090131 B1 | 12/2011 |
| KR | 101622469 B1 | 5/2016 |
| KR | 102430967 B1 | 8/2022 |
| KR | 1020230032819 A | 3/2023 |

* cited by examiner

MOVING DIRECTION

MOVING DIRECTION

SURFACE MOUNT TYPE OPTICAL MODULE AND ATTACHMENT/DETACHMENT APPARATUS AND METHOD THEREOF

CROSS-REFERENCE TO RELATED APPLICATION

This application claims priority under 35 U.S.C. § 119(a) to Korean Patent Application No. 10-2022-0117652 filed on Sep. 19, 2022, in the Korean Intellectual Property Office, the disclosure of which is incorporated herein by reference in its entirety.

BACKGROUND

1. Technical Field

The present disclosure relates to an optical module for an optical network. More particularly, the present disclosure relates to a surface mount type optical module mounted on a surface of a system board or a package submount on which electronic devices are mounted, and an apparatus and method for attaching and detaching the optical module.

2. Related Art

In the case of conventional optical modules for optical networks, pluggable optical modules fastened to an external front panel of the system have been mainly used (Pluggable optics type). The pluggable optics type, as shown in FIG. 1, can be easily installed because its fastening is performed by using a socket located outside a system. However, as data traffic increases due to the wide propagation of large-capacity data services, transmission speed and power consumption required for optical modules increase. In the case of the pluggable optics type, the distance between an optical element and an electronic device, such as a switch IC, a high-speed processor ASIC (application specific integrated circuit), etc., inside the system is long, resulting in loss and distortion of high-frequency signals. Accordingly, there is a need for an optical module to which a new connection method is applied, thereby being capable of reducing loss of high-frequency signals and minimizing power consumption.

To fulfill these technological demands, a new type of optical module standard called On-board optics (COBO, Consortium for On-board Optics) has been proposed. The On-board optics, which is a technology for mounting an optical module inside the system board, could minimize the distance between an optical element and an electronic device. However, for the convenience of maintenance, an on-board optics optical module has adopted a fastening scheme in which it is attached or detached by using a socket between the PCB (Printed Circuit Board) and the optical module for replacement work, and thus it is inevitably accompanied by problems such as impedance mismatch at the contact between the electrodes of the optical module and the socket, loss of high-frequency signals due to high-frequency parasitic components, and noise along with the limitations of miniaturization of an optical module resulting from the volume of the socket, and the limitations of close placement with an electronic device such as ASIC or switch IC, which has leaded to a limit to high-speed signal transmission.

Recently, in order to solve this problem, Multi-source agreement (MSA) standard for an optical module, such as Co-Packaged Optics, Near Package Optics, etc., has been proposed. The standard can minimize high-speed signal loss by using, instead of the existing socket scheme, metal solder balls for densely arranged electrodes such as LGA (Land Grid Array) in order to minimize the transmission loss while reducing the distance between the electronic device and the optical module that are closely mounted on the system board or package submount. However, for maintenance, high-speed optical modules adopting the Co-Packaged Optics or Near Package Optics require a device(s) that can selectively bond or debond the optical modules to be replaced only for attachment or detachment without physically affecting other neighboring components in a narrowly confined working space such as some part of the system board or inside the package submount.

SUMMARY

The present disclosure is to provide a surface mount type optical module mounted on the surface of a system board or package submount (hereinafter, referred to as a 'board'), and is to provide a compact and lightweight optical module attachment/detachment apparatus and method that perform the mounting (attachment) and separation of the optical module in a narrowly confined space by automatically performing optical module loading/unloading, optical module alignment, and non-contact soldering using a laser light source to facilitate attachment or detachment of the optical module.

In order to address the above-mentioned problems, an aspect of the present disclosure provides a surface mount type optical module attachment/detachment apparatus which includes a body frame of the attachment/detachment apparatus for attaching or separating a surface mount type optical module (hereinafter, referred to as an 'optical module') to or from a board; a fixing part for fixing the body frame to the board; a gripper for gripping the optical module; an aligning part for aligning the position of the optical module with respect to the board; and a laser part which irradiates a laser for non-contact bonding between the optical module and the board.

Herein, the surface mount type optical module may include an optical module body; and a groove formed from the outer side of the optical module body toward the inner side, wherein the groove includes a lower inclined surface and an upper inclined surface inclined in a direction different from the lower inclined surface, so that, when the gripper applies force to the lower inclined surface of the groove, the optical module body is moved downward, while, when the gripper applies force to the upper inclined surface of the groove, the optical module body is moved upward.

Additionally, another aspect of the present disclosure provides a method for attaching or detaching a surface mount type optical module to or from a board using the above-described surface mount type optical module attachment/detachment apparatus (hereinafter, referred to as an 'attachment/detachment apparatus'). The method may include: fixing a fixing part of the attachment/detachment apparatus to the board; gripping the optical module with a gripper of the attachment/detachment apparatus using a groove of the optical module; aligning the position of the optical module with respect to the board with an aligning part of the attachment/detachment apparatus; and bonding the optical module and the board by irradiating a laser beam to them with a laser part of the attachment/detachment apparatus.

According to an aspect different from the aforementioned ones, a method for attaching or detaching the optical module may include fixing a fixing part of the attachment/detachment apparatus to the board; gripping the optical module with a gripper of the attachment/detachment apparatus using a groove of the optical module; debonding the optical module and the board by irradiating a laser beam to them with a laser part of the attachment/detachment apparatus.

The above-described means for solving the problems will become clearer through the embodiments of the disclosure to be described later in conjunction with the drawings.

DETAILED DESCRIPTION

Hereinafter, preferred embodiments of the present disclosure will be described in detail with reference to the accompanying drawings. As used herein, the terms are for the purpose of describing the embodiments of the present disclosure, and are not intended to limit the present disclosure. Herein, terms in the singular form also relate to the plural form unless specifically stated otherwise. As used herein, the terms "comprise", "comprising" or the like is used to specify the presence of stated components, steps, operations, and/or elements, but does not preclude the presence or addition of at least one other component, step, operation, and/or element.

Figure 1:
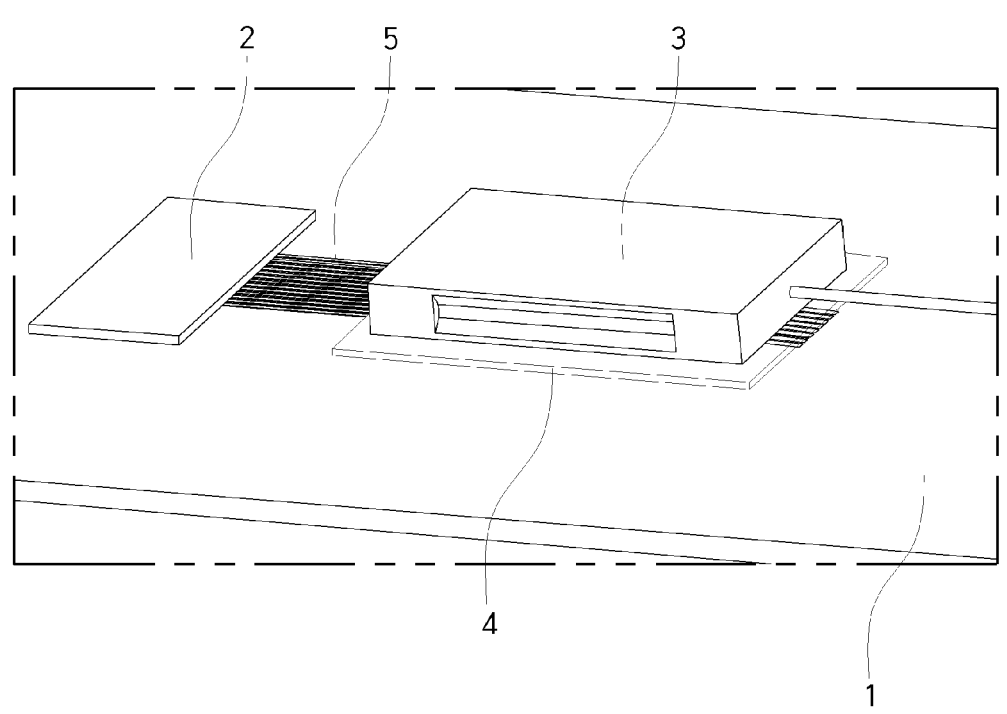
FIG. 1 is a conceptual diagram of a surface mount type optical module.

FIG. 1 is a conceptual diagram of a recently proposed surface mount type optical module adopting Co-Packaged Optics or Near Package Optics.

An optical module 3 is surface mounted near an electronic device 2 on the surface of a board 1, i.e., system board or package submount, to realize the purpose of minimizing transmission loss or power consumption by being located close to the electronic device 2 such as a DSP or an ASIC chip mounted on the board 1. The surface mount type optical module 3 may be electrically connected to the electronic devices 2 by the medium of an interposer 4 of a material such as glass. For its electrical connection to the electronic device 2, non-contact soldering by laser with an upper electrode 5 of the board 1 may be used.

Figure 2:
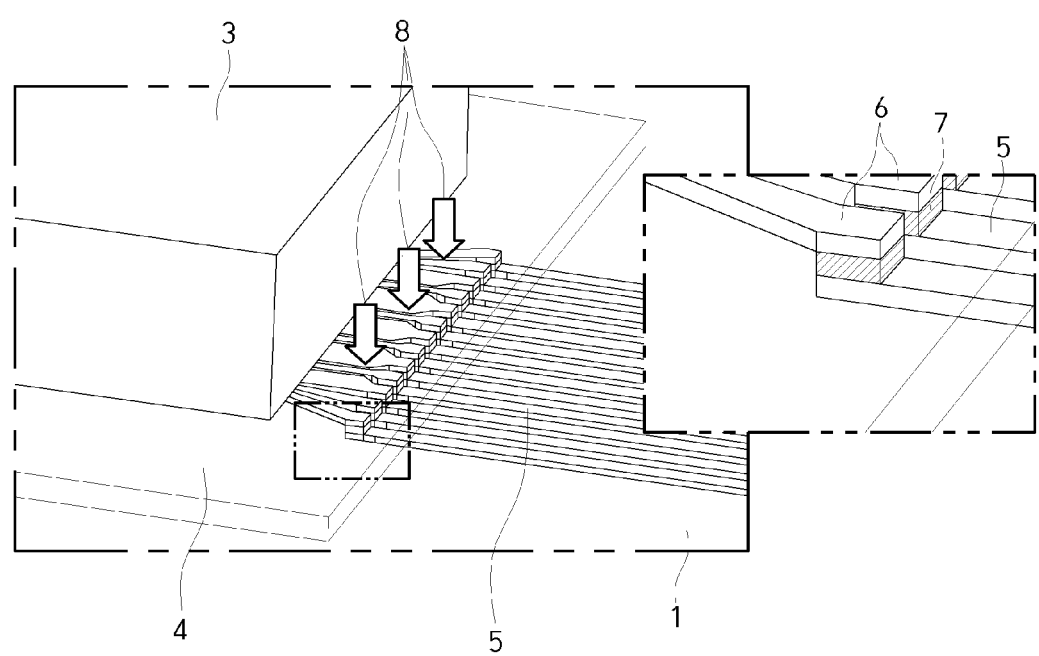
FIG. 2 is a diagram of non-contact laser bonding between an optical module (3) and a board (1).

FIG. 2 is a view for explaining non-contact laser bonding method between the optical module 3 and the board 1. After applying a solder 7 between an electrode 6 of the glass interposer 4 and an electrode 5 of the board 1, a laser beam 8 is irradiated from above the interposer 4, allowing the laser beam 8 to transmit through the glass interposer 4. The laser beam 8 is absorbed by the electrode 6 of the interposer 4 to generate heat, which causes the solder 7 to be melt, so that the electrode 6 of the interposer 4 and the electrode 5 of the board 1 are bonded. No electrode is disposed on the upper part of the glass interposer 4 so that the laser beam 8 can transmit therethrough.

Figure 3:
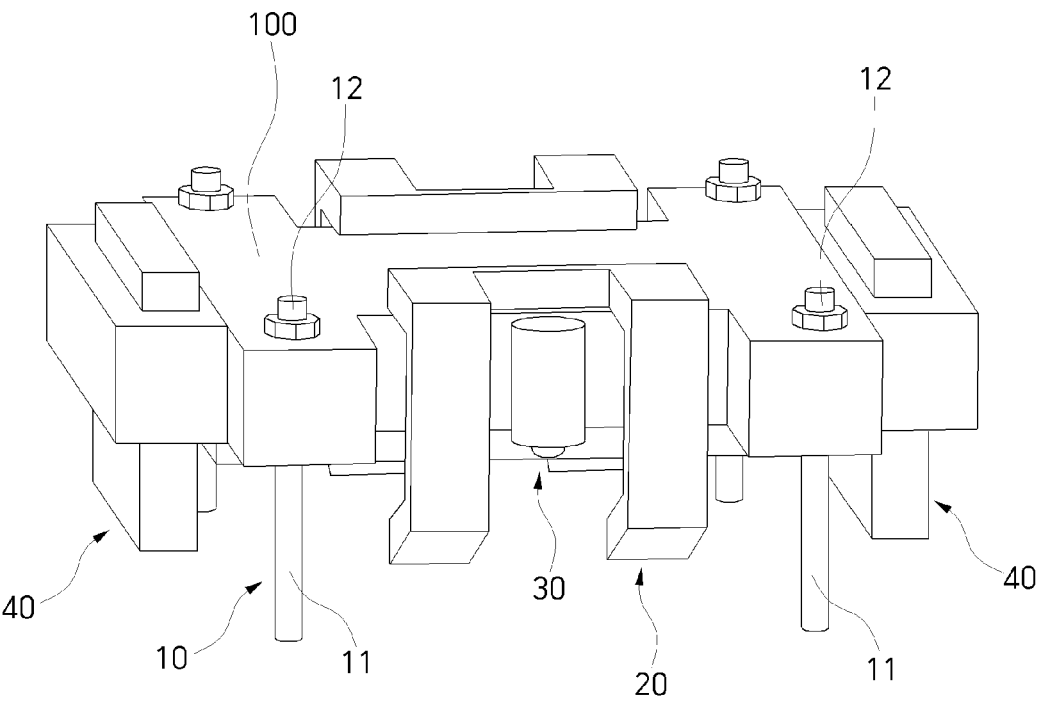
FIG. 3 is an external perspective view of a board surface mount type optical module attachment/detachment apparatus according to an embodiment of the present disclosure.

FIG. 3 is an external perspective view of a surface mount type optical module attachment/detachment apparatus according to one embodiment of the present disclosure. It can have a small size, a light weight, and be used portably because of its compact structure and the integrated configuration of respective components. In order to use the optical module attachment/detachment apparatus, the shape of a surface mount type optical module needs to correspond to the apparatus also. The shape of the surface mount type optical module will be described later with reference to FIGS. 6A and 6B.

The surface mount type optical module attachment/detachment apparatus basically performs functions of loading (i.e., mounting) and unloading (i.e., separation), securely positioning and aligning the optical module, and of conducting the non-contact bonding of the same. For this, the attachment/detachment apparatus includes a fixing part for fixing the position of the optical module attachment/detachment apparatus so that the laser beam can be accurately irradiated to the plurality of electrodes 5 of the board 1; a gripper 20 for gripping the optical module 3 to load and unload it; an aligning part 30 for accurate alignment between the electrode of the optical module 3 and the electrode of the board 1; and a laser part 40 for irradiating laser beam for non-contact bonding of the electrodes. These components are attached to a central part each, a longitudinal end, and a lateral end of a body frame 100 approximately having an "I" shape to form a compact structure.

The fixing part 10 includes fixing pins 11 vertically coupled penetrating four lateral ends of the body frame 100, and fasteners 12 for fastening the fixing pins 11 to the body frame 100. The number of the fixing pins 11 is not limited to four as shown in FIG. 3. When each of the fixing pins 11 is inserted into a pre-formed guide hole (not shown) in the board 1, the position of the body frame 100 is accurately fixed, so that operations such as positioning, alignment, and bonding of the optical module 3 can be performed accurately.

The gripper 20 is installed at the central part of the body frame 100 in the lateral direction to grip the optical module 3 from the side. Although this will be described later, the gripper 20 may be configured in the form of a pair of hooks so as to grip the grooves formed on the opposite sides of the optical module 3, in the lateral direction. That is to say, a pair of grippers 20 in the form of hooks can grip both sides of the optical module 3 and press the optical module 3 down toward the board 1 to be attached, or up away from the board to be separated. The surface mount optical module attachment/detachment apparatus according to the present disclosure has a structure capable of applying force in each direction, in particular, when attaching or detaching the optical module 3. This will be described later.

The aligning part 30 may be realized as a camera 31 (in FIG. 7) located in the central part of the body frame 100 and capable of observing below. That is, the aligning part 30 may include a camera and its controller. When the body frame 100 is fixed to the board 1 by the fixing part 10, the camera may capture an alignment mark on the upper surface of the board 1 and match the loading position of the optical module 3 to the alignment mark.

The laser part 40 serves to irradiate a high-power laser to the electrode of the board 1 and the electrode of the interposer 4 for non-contact laser soldering (or bonding), and in the embodiment of FIG. 3, the laser parts 40 are located at the longitudinal ends on both sides of the body frame 100. The laser part 40 needs to accurately irradiate laser to the position of an electrode to be soldered in order to perform soldering in a non-contact manner by irradiating the laser to a metal surface.

Figure 4:
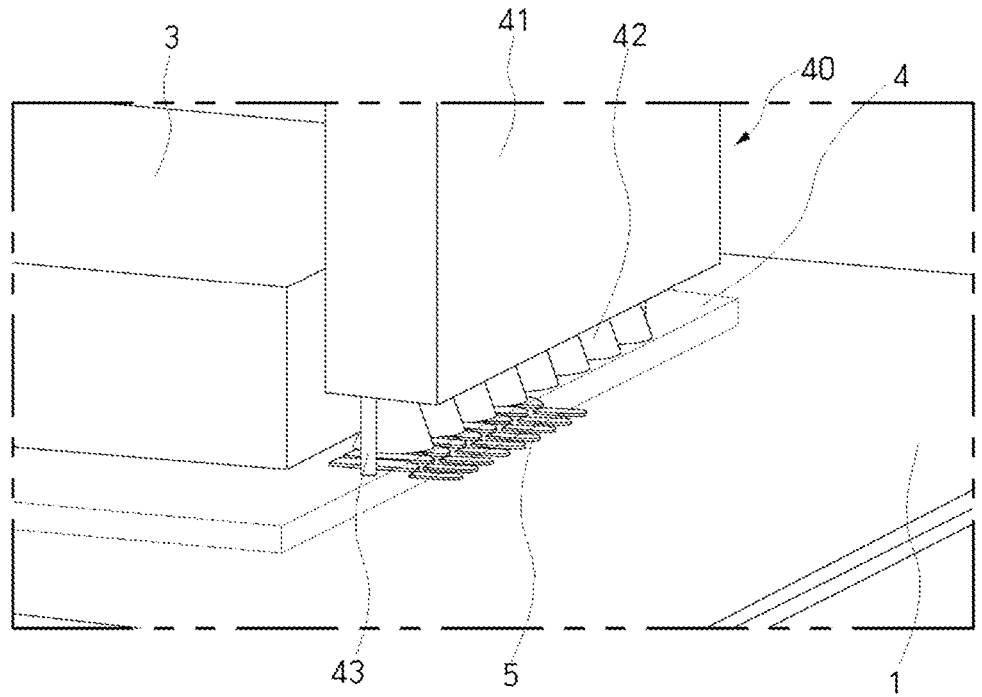
FIG. 4 is a perspective view of a laser part (40) of FIG. 3.

FIG. 4 represents an embodiment of the laser part 40. The laser part 40 uses a high-power laser beam having a wavelength that transmits glass material. In order to effectively irradiate a laser beam 42 to the solder 7 (see FIG. 2) applied on the electrodes of the board 1 or those of the glass interposer 4, the laser part 40 includes a fiber array block (FAB) 41 for matching the laser beam to the arrangement spacing and the number of electrodes. The fiber array block 41 has the advantage of being able to flexibly respond to various types of electrode patterns because the configuration of its irradiation channels can be freely changed. On the other hand, a guide light channel 43 capable of passing a visible guide light is added to the outermost channel of one or both ends of the fiber array block 41 to directly monitor in advance by naked eye the expected point where the laser beam is irradiated. Accordingly, it is possible to accurately align the laser beam target positions to the electrodes to be soldered.

Figure 5:
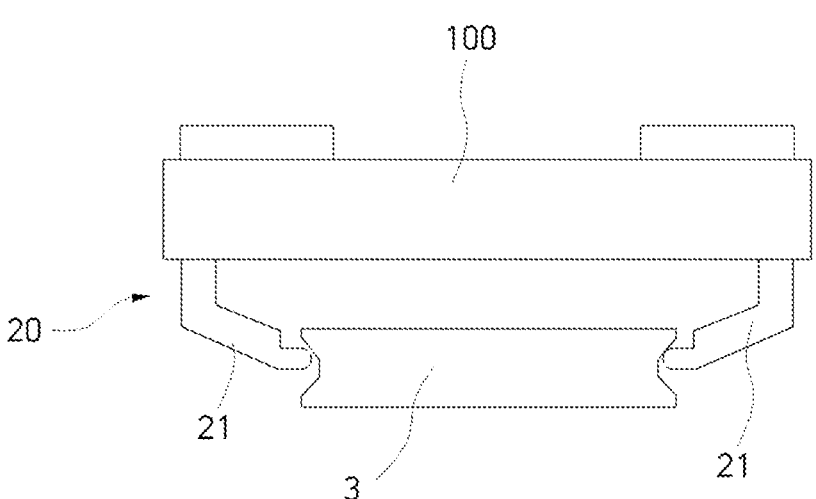
FIG. 5 is a side view of a gripper (20) of FIG. 3.
Figure 6A:
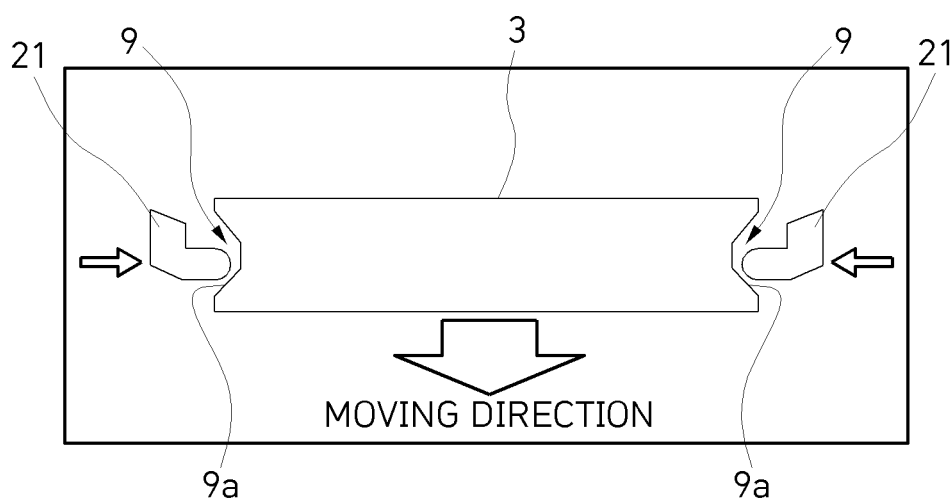
FIGS. 6A and 6B are views for explaining the shape of the surface mount type optical module, which is the object of use of the optical module attachment/detachment apparatus according to the present disclosure, and the action of the gripper (20) thereon.
Figure 6B:
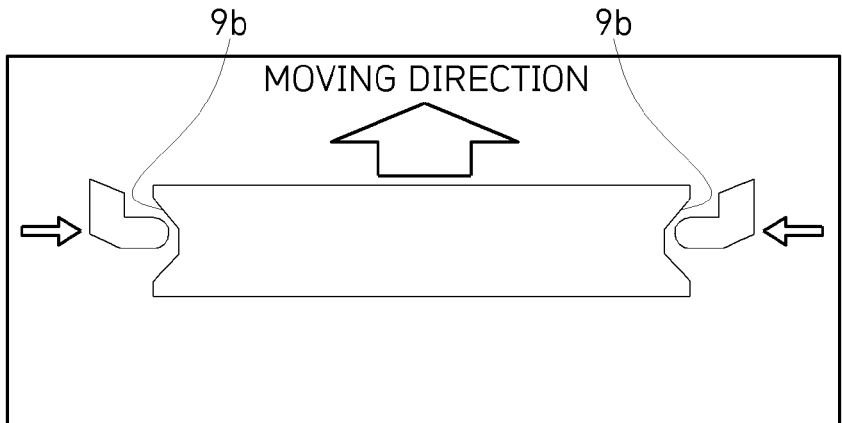

FIG. 5 is a side view for detailed description of the gripper 20 gripping the optical module 3 for attachment/detachment of the optical module 3. And FIGS. 6A and 6B are for explaining the shape of the surface mount type optical module 3, which is the object of use of the above-described attachment/detachment apparatus for the surface mount type optical module, and the action of the gripper 20 thereon.

The gripper 20 includes a pair of grip arms 21 protruding downward from both sides of the body frame 100, which enters grooves 9 formed on both sides of the optical module 3 to apply force thereto. To this end, each groove 9 formed on the side surface of the optical module 3 is formed to have a lower inclined surface 9a and an upper inclined surface 9b in the form of a recess from the side of the module 3 toward the inside. The lower inclined surface 9a and the upper inclined surface 9b are inclined in different directions as shown in FIGS. 6A and 6B.

In order to attach or detach the optical module 3 to or from the board 1, the solder is melted using a high-power laser and at the same time the optical module 3 is moved upward or downward with respect to the board 1 so as to attach thereto and separate therefrom the optical module 3. As shown in FIGS. 6A and 6B, both attachment and detachment of the optical module 3 can be performed with the pair of grip arms 21. That is, as shown in FIG. 6A, when the optical module 3 needs to be pressed toward the board at the time of the attachment of the optical module 3, the grip arms 21 apply force to the lower inclined surface 9a of the groove 9 to move the optical module 3 downward. When the optical module 3 needs to be lifted up from the board at the time of the detachment of the optical module 3, as shown in FIG. 6B, the grip arms 21 apply force to the upper inclined surface 9b of the groove 9 to move the optical module 3 upward. As described above, according to the present disclosure, the optical module 3 can be attached to the board 1 or detached from the board 1 by simply changing the pressing position with respect to the sides of the optical module with the gripper 10 having a relatively simple structure.

Figure 7:
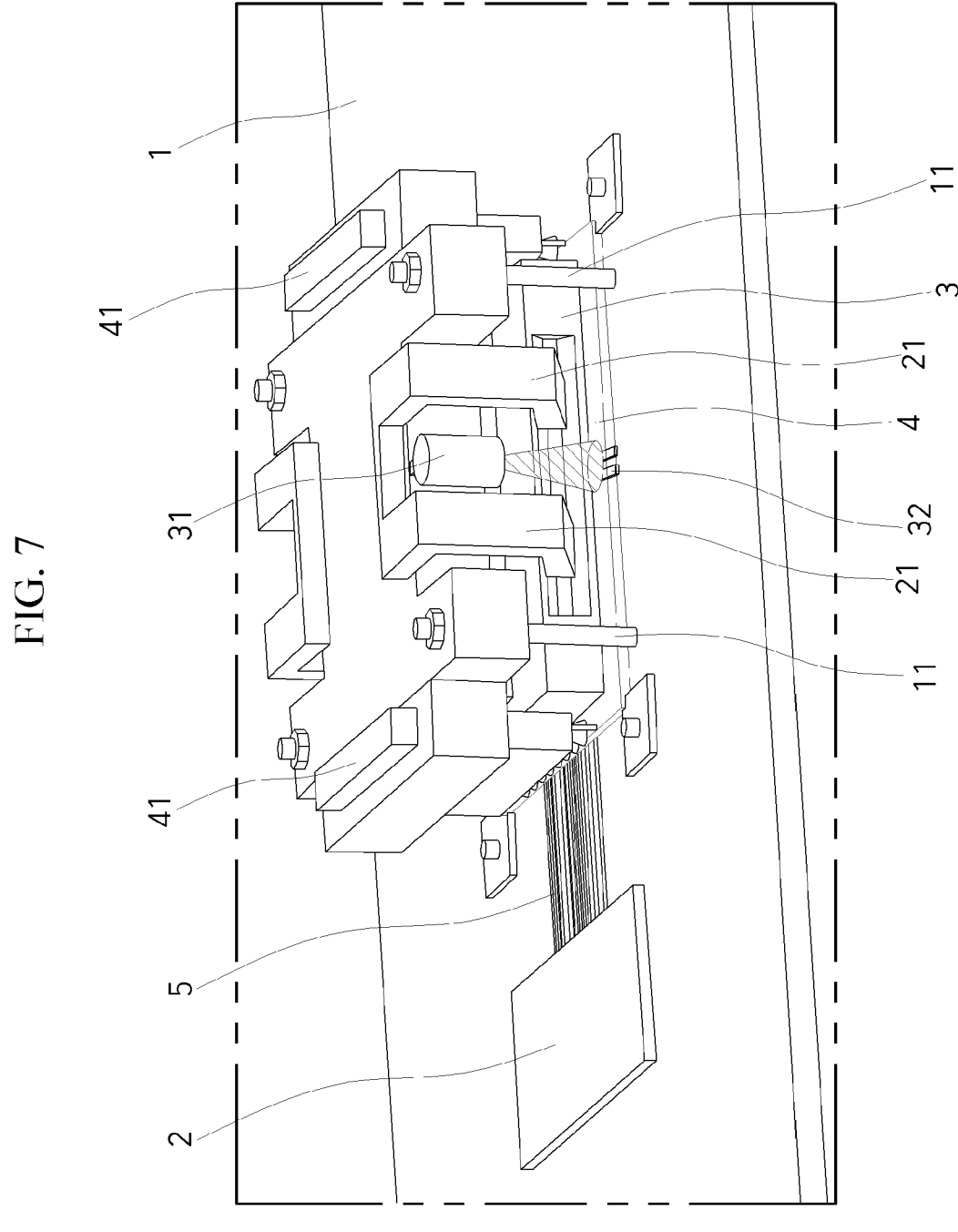
FIG. 7 is a diagram of a method of using a surface mount type optical module attachment/detachment apparatus of the present disclosure.

FIG. 7 illustrates a method of using the surface mount type optical module attachment/detachment apparatus of the present disclosure.

As a first step of attaching the optical module 3 to the board 1, the fixing pins 11 of the attachment/detachment apparatus are fixed to the board 1 in a direction perpendicular to the board 1 so that the glass interposer 4 and the board 1 can contact each other. Thereafter, the optical module 3 is gripped by the grip arms 21 of the gripper 20 using the side grooves 9 of the surface mount type optical module 3 manufactured as shown in FIGS. 6A and 6B. In this process, the alignment between the electrodes of the glass interposer 4 and the electrodes of the board 1 is checked through the camera 31 attached to the attachment/detachment apparatus. In this regard, an alignment mark or an alignment key may be prepared on each of the glass interposer 4 and the board 1 in the proximity of the optical module 3, and alignment between the electrodes may be checked using the camera 31 of the alignment part 30.

When the fixing of the attachment/detachment apparatus and the checking of the alignment of the electrodes are completed as described above, the laser source of the laser part 40 irradiates a laser beam to the electrode to melt the solder applied on the electrodes of the glass interposer 4 or those of the board 1. At the same time, the grip arms 21 of the gripper 20 press the optical module 3 toward the board 1 as shown in FIG. 6A to bond the module 3 and the electrode of the glass interposer 4 or the electrodes of the board 1.

On the other hand, in order to detach the optical module 3 attached to the board 1, gripping the sides of the optical module 3 with the grip arms 21 of the gripper 20 and applying force to the module toward the top of the board 1, the laser source of the laser part 40 irradiates the laser beam to the bonded electrodes to melt and debond the solder, so that the optical module 3 is moved up (see FIG. 6B).

From the foregoing, due to the shape of the surface mount type optical module and its attachment/detachment apparatus of the miniaturized structure, automatic loading or unloading of the optical module, alignment of the optical module, and non-contact laser soldering can be performed. Therefore, it is possible to easily attach or detach the surface mount type optical module in a confined space inside a restricted space of a system where large equipment cannot be used. Additionally, due to its portable structure, immediate availability in the field becomes maximized.

In the above, an embodiment specifically realizing the technical idea of the present disclosure has been described. However, it should be noted that the technical scope of the present disclosure is not limited to the embodiments and drawings described above, but is determined by reasonable interpretation of the claims.

What is claimed is:

1. An attachment/detachment apparatus of a surface mount type optical module (hereinafter, referred to as an 'optical module'), the apparatus comprising:
   a body frame for attaching or separating the optical module to or from a board;
   a fixing part for fixing the body frame to the board;
   a gripper for gripping the optical module;
   an aligning part for aligning the position of the optical module with respect to the board; and
   a laser part which irradiates a laser for non-contact bonding between the optical module and the board,
   wherein the laser part includes a fiber array block (FAB) including fibers for irradiating laser beams to the optical module and the board.

2. The apparatus of claim 1, wherein:
   the body frame has an "I" shape;

the aligning part and the gripper are located in the central part of the body frame;

the laser part is located at the longitudinal end of the body frame; and the fixing part is located at the lateral end of the body frame.

3. The apparatus of claim 1, wherein the fixing part includes fixing pins vertically coupled the body frame.

4. The apparatus of claim 3, wherein the number of the fixing pins is four.

5. The apparatus of claim 1, wherein the gripper includes a grip arm which enters a groove formed on the optical module and grips the optical module.

6. The apparatus of claim 5, wherein there are at least one pair of grip arms facing each other at both sides of the body frame.

7. The apparatus of claim 1, wherein the gripper is configured to grip the optical module and to move the optical module to and from the board.

8. The apparatus of claim 1, wherein the aligning part includes a camera for observing the board.

9. The apparatus of claim 1, wherein the aligning part uses an alignment mark to align the position of the optical module with respect to the board.

10. The apparatus of claim 1, wherein at least one of the fibers of the fiber array block passes a visible guide light.

11. A method for attaching or detaching a surface mount type optical module (hereinafter, referred to as an 'optical module') to and from a board by using an attachment/detachment apparatus, the method comprising:

fixing a fixing part of the attachment/detachment apparatus to the board;

gripping the optical module with a gripper of the attachment/detachment apparatus using a groove of the optical module;

aligning the position of the optical module with respect to the board with an aligning part of the attachment/detachment apparatus; and bonding the optical module and the board by irradiating a laser beam to them with a laser part of the attachment/detachment apparatus, wherein the laser part includes a fiber array block (FAB) including fibers for irradiating laser beams to the optical module and the board.

12. The method of claim 11, wherein aligning the position of the optical module with respect to the board uses an alignment mark.

13. The method of claim 11, wherein gripping the optical module with the gripper of the attachment/detachment apparatus includes applying a downward force to the groove formed on the optical module so that the body of the optical module is moved toward the board.

14. A method for attaching or detaching a surface mount type optical module (hereinafter, referred to as an 'optical module') to and from a board by using an attachment/detachment apparatus, the method comprising:

fixing a fixing part of the attachment/detachment apparatus to the board;

gripping the optical module with a gripper of the attachment/detachment apparatus using a groove of the optical module; and debonding the optical module and the board by irradiating a laser beam to them with a laser part of the attachment/detachment apparatus.

15. The method of claim 14, further comprising after the debonding the optical module and the board by irradiating the laser beam to them, separating the optical module from the board by applying an upward force to the groove formed on the optical module gripped by the gripper.

* * * * *